United States Patent [19]

Subramanian

[11] Patent Number: 5,011,035
[45] Date of Patent: Apr. 30, 1991

[54] PRESSURE REGULATING SYSTEM FOR USE IN PRESSURE COOKERS AND PRESSURE COOKER HAVING THE SAME

[75] Inventor: Naranammalpuram S. Subramanian, Maharashtra, India

[73] Assignee: Hawkins Cookers Limited, Maharashtra, India

[21] Appl. No.: 526,789

[22] Filed: May 22, 1990

Related U.S. Application Data

[63] Continuation of Ser. No. 235,458, Aug. 24, 1988, abandoned.

[30] Foreign Application Priority Data

Jul. 21, 1987 [IN] India .................................. 231/87

[51] Int. Cl.⁵ .............................................. B65D 51/16
[52] U.S. Cl. .................................................. 220/203
[58] Field of Search ........................................ 220/203

[56] References Cited

U.S. PATENT DOCUMENTS

| | | | |
|---|---|---|---|
| 2,463,516 | 3/1949 | Burkhardt | 220/203 X |
| 2,619,982 | 12/1952 | Turner | 220/203 X |
| 2,712,829 | 7/1955 | Whitaker | 220/203 X |
| 2,860,811 | 11/1958 | Hessler | 220/203 |
| 3,949,781 | 4/1976 | Scalabrin | 220/203 X |
| 4,143,787 | 3/1979 | Walker | 220/203 |
| 4,160,462 | 7/1979 | Rossi-Ashton | 220/203 X |
| 4,165,816 | 8/1979 | Tupper | 220/203 |
| 4,466,550 | 8/1984 | Sullivan | 220/203 X |
| 4,534,485 | 8/1985 | Subramanian | 220/203 |
| 4,560,143 | 12/1985 | Robinson | 220/203 X |
| 4,741,325 | 5/1988 | Anota | 220/203 X |

FOREIGN PATENT DOCUMENTS

| | | | |
|---|---|---|---|
| 2606676 | 9/1977 | Fed. Rep. of Germany | 220/203 |
| 1188831 | 9/1959 | France | 220/203 |
| 1088700 | 4/1984 | U.S.S.R. | 220/203 |

Primary Examiner—Stephen Marcus
Assistant Examiner—Nova Stucker
Attorney, Agent, or Firm—Kerkam, Stowell, Kondracki & Clarke

[57] ABSTRACT

In and for a pressure cooker having an open mouth vessel and a lid which can be sealingly fitted to the mouth of the vessel, a pressure regulating valve fitted to the lid of the vessel comprises a vent tube and a vent weight which vent weight is adapted to be seated over the mouth of the vent tube, said vent tube having a downwardly extending pin to slide into a bore of the head of the vent tube, the vent weight having one or more openings for the escape of the steam when the vent weight is lifted. The vent weight is held by a fulcrumed lever having a passage exposed at one end to the atmosphere and at the other end cooperating with the said openings of the vent weight. The bore or passage of the vent tube is larger in diameter than the said bore or mouth of the vent tube on which the said pin of the vent weight seats. The bore or passage of the vent tube opens into a frusto conical section whose lower end has a diameter larger than that of its upper end. A hollow holding nut is secured to the bottom of the vent tube and said nut includes a chamber having a planar surface and a plurality of holes for entry of steam.

1 Claim, 1 Drawing Sheet

PRESSURE REGULATING SYSTEM FOR USE IN PRESSURE COOKERS AND PRESSURE COOKER HAVING THE SAME

This is a continuation, of application Ser. No. 235,458, filed Aug. 24, 1988; abandoned.

This invention relates to pressure cookers generally used for cooking foodstuff.

A pressure cooker comprises an open mouth vessel and a removable lid which can sealingly fitted to the mouth. The lid has a pressure regulating valve which functions when the steam pressure within the vessel exceeds a safe limit. The valve exhausts the steam through a vent tube on which is fitted a vent weight.

It has been experienced that the vent tube sometimes get clogged with particles of food being cooked in the cooker. The result is that the vent tube and the vent weight become ineffective with the result that due to high pressure of steam in the vessel, explosion can occur.

The vent weight becomes so hot that it can be removed only by a tool but the material which clogs the passage of the vent tube cannot be easily removed.

The object of the present invention is to provide a pressure coker in which the vent tube and the vent weight are so designed that the possibility of clogging of the vent tube is stantially eliminated.

A further object of the invention is to provide means whereby the operator of the cooker can determine if the vent tube is functioning effectively and is not clogged.

It has already been proposed in U.S. Pat. No. 4,534,485 to have a pressure regulating system for a pressure cooker which has the following features.

A pressure regulating valve which is fitted to the lid of the vessel and comprises a vent tube which extends partially below the lid and partially remains above the lid, a vent weight seated over the upper end of vent tube, said vent weight having a downwardly extending pin slidably engaging a bore in the head of the vent tube, the vent weight having one or more openings for the escape of steam when the said vent weight is lifted due to the pressure of steam inside the vessel, the vent weight being held by a fulcrumed lever which has a passage exposed at one end to the atmosphere and at the other end to the said opening or openings in the vent weight, so that when the pressure of steam in the vessel exceeds a desired limit, the vent weight is lifted to allow the steam to be released through the vertical bore of the vent tube, the opening/openings in the vent weight and the passage in the fulcrumed lever which is exposed to the atmosphere, the lower end of the vent tube which extends into the vessel being fitted a nut having a plurality of lateral or axial holes for the passage of steam from within the vessel to enter the vent tube. The pin of the vent weight is pointed and engages the bore in the head of the vent tube.

Further improvements have now been effected which now distinguish the pressure regulating system of this invention from the above stated system.

The following features are thus important which distinguish the invention.

1. The vent tube instead having a uniform diameter bore throughout its length as in the previous system has a frusto conical section as its lower end so that it has larger diameter than the inside diameter of the vent tube and also a frusto conical section at its top end where it joins the outlet bore.

2. The nut being fitted at the lower end of the vent tube, in addition to having a plurality of lateral or axial holes for the steam to escape from within the vessel to enter the vent tube also has a plurality of vertical bores from its bottom wall.

In the accompanyings drawings we have illustrated the features of the invention.

Referring to the drawings.

Figure 1:
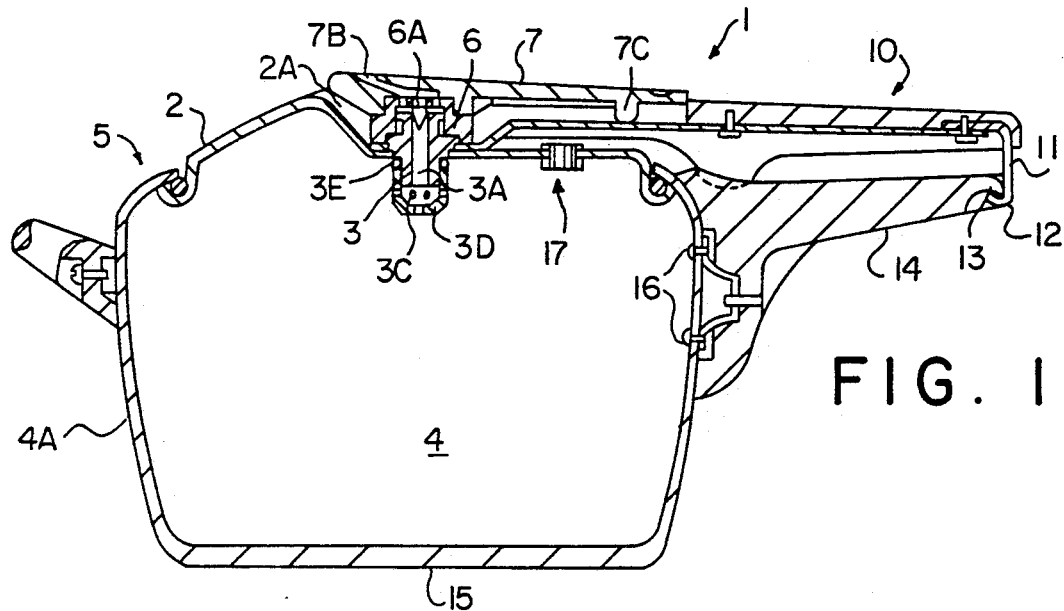
FIG. 1 shows a sectional elevation of the pressure cooker of the earlier invention showing in section the vent tube, the vent weight and the fulcrumed lever.
Figure 2:
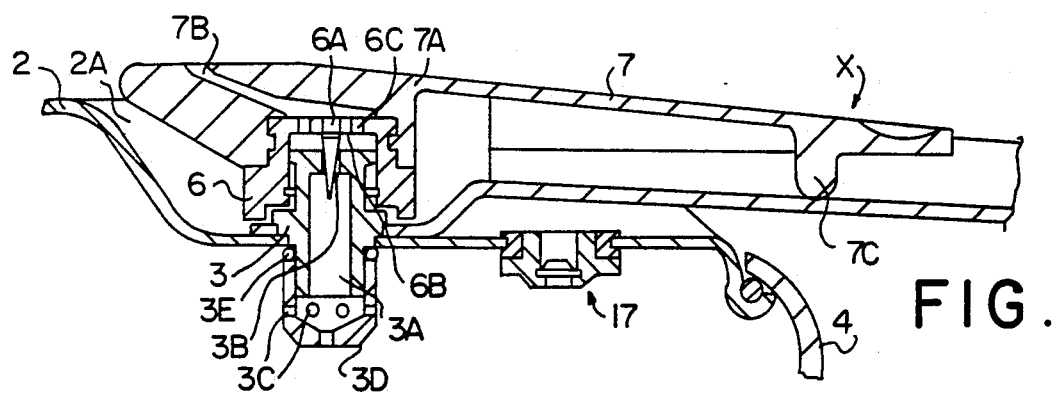
FIG. 2 shows in section only the lid with the vent tube, the vent weight and the fulcrumed lever and a part of the vessel in section of FIG. 1

While referring generally to all the components which form the pressure cooker, we will describe more specifically the salient features of the improved construction.

In the lid 2 of the pressure cooker which is slightly dome shaped there is formed a depression marked 2A for the convenience of accommodating the various components hereinafter described.

In the lid 2 ther is fitted a vent tube 3 which partially extends below the lid 2 and partially extends above the lid 2.

At the upper end of the vent tube is formed a vertical bore 3B while the bore 3A of the vent tube 3 below the said bore 3B is of much larger diameter. The portion of the vent tube 3 which extends below the lid 2 into the vessel 4 is tightly secured at its lower end with the lid 2 by a nut 3D in which are formed a plurality of holes 3C through which the steam developed within the vessel 4 enters the vent tube 3. 3E shows the sealing ring between the nut 3D and the lid 2.

Vent weight 6 has a downwardly extending pin 6A which enters the opening 3B in the head of the vent tube 3. The pin 6A extends below the base 6B of the vent weight 6 in which base are formed one or more openings 6C for the escape of steam.

The vent weight 6 is firmly held at the end 7A of a fulcrumed lever 7. In this end of the fulcrumed lever 7 is formed a sloping passage 7B which is in communication with the opening 6C of the vent weight 6.

The pin 6A which depends from the vent weight 6 and enters the bore 3B of the vent tube is of tapered section,. The object of making it in tapered section is that it always keeps the opening at the head of the vent tube free of any clogging by particles of food which may enter the vent tube 3. Further due to enlarged section of the bore 3A of the vent tube 3 no clogging can take place because of the larger diameter. This is further prevented by the provision of the nut 3D.

In actual operation when the fulcrumed lever 7 which is fulcrumed at 7C is pressed down, the vent weight 6 which is held to the lever 7 moves up thereby allowing the steam from within the vessel to escape first through opening 3C, then through the opening 3B and thereafter through opening 6C, finally escaping through the passage 7B in the head of the lever 7.

As soon as the pressure within the vessel is stabilised, and the pressure within the vessel 4 falls below a certain value the vent weight will come down with the pin 6A of the vent weight 6 occupying the seat in the opening 3B of the vent tube 3 so that the pressure within the vessel is normalised and the cooking can carry on.

The same process is repeated when the pressure within the vessel exceeds a certain limit, for example, when the pressure within the vessel is above 15 p.s.i. due to the pressure built up in the vessel 4, the vent weight 6 will automatically lift up allowing the excape of excess steam.

The passage 7B is inclined so that it allows the steam escaping through the same to be ejected away from the operator. In experiments it has been found that sound is produced with the escape of steam which is in the form of periodical puffs, accompanied by visible up and down movement of the vent weight 6 fitted to the fulcrumed lever 7. This ensures the operator that the pressure cooker is functioning well.

The fulcrumed lever 7 can be fitted in any manner and in accordance with one embodiment as shown in FIG. 1 it is fitted in a channel formed in the handle 10 which has a latch 11 whose latching end 12 slips over the rounded end 13 of a bracket or handle 14 which is secured to vessel 4 by means of rivets 16

Figure 3:
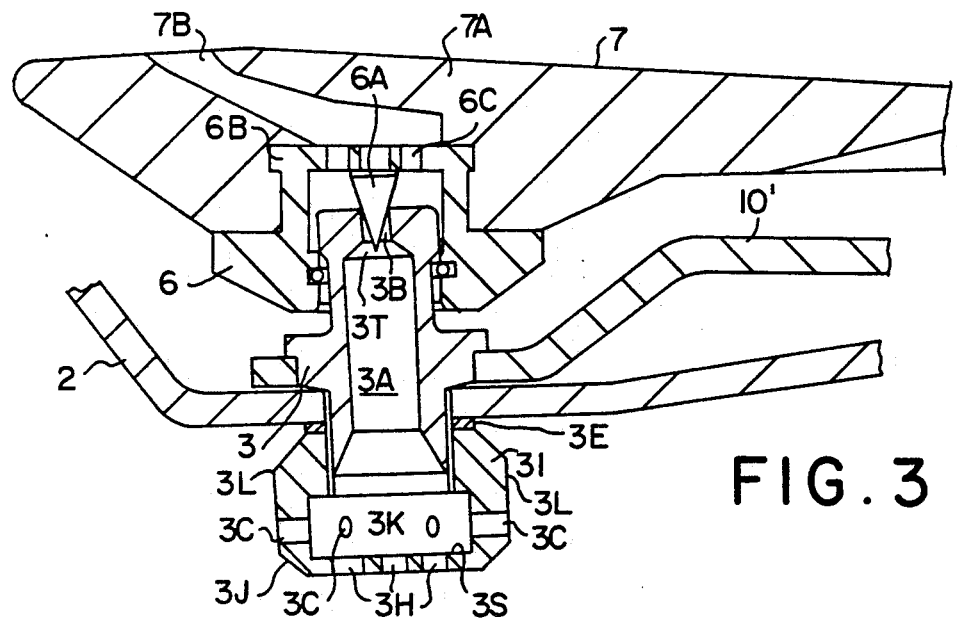
FIG. 3 shows an embodiment of the invention in which the vent tube has a modified section at its upper and lower ends and the nut fitted at the lower end of the vent tube has a larger size than the nut shown in FIG. 2 so that it can have a larger number of holes than in the embodiment of FIGS. 1 and 2.

We now describe the construction according to the present invention (FIG. 3).

It will be seen from the drawings that a pressure regulating system for the pressure cooker has three essential components viz. the vent tube 3, the holding nut 3D and the vent weight 6. The vent tube 3 is shown secured to the lid 2 of the pressure cooker by its shoulder 3F with the help of the holding nut 3D. Between the lid 2 and the shoulder 3F is provided the handle 5 of the lid such that when the vent tube is secured to the lid with the help of the holding nut, the handle is also secured to the lid.

A suitable washer 3E is used for better holding of the components.

The vent tube is provided with 3 sections, a lower frusto conical section 3G and an intermediate cylindrical section 3A, and an upper frusto conical section 3T contiguous with one another. In the embodiment of this invention, the lower section is the frusto conical section 3G with the narrower end pointing upwards while the divergent end is downwards. The intermediate section 3A is predominantly a cylindrical bore or passage having a frusto conical upper section 3T. The upper section 3T opens into a narrower cylindrical section as shown and is also frusto conical with the narrower end pointing upwards contiguous with the narrow opening or bore.

The hollow holding nut 3D has a chamber 3K having a diameter larger than that of the contiguous conical section 3G as shown in the drawing and having planar bottom surface 3S, provided with a plurality of fine steam entry holes 3H. It has two internal sections 3I and 3J of which the upper section 3I has suitably formed internal threadings adapted to be secured to the external threaded section of the lower end of the vent tube. The lower section 3J of the holding nut is wider than the upper section 3I in cross section and is preferably cylindrical. Suitable fine steam entry holes 3C are formed through the vertical side 3L of the holding nut in the region of the lower section 3J. Though only one hole is shown on each of the vertical sides of the external hexagonally shaped holding nut, it is within the scope of the invention, to have more than one hole on each side in that region in one or more rows as shown, for example, in the front side where two holes are illustrated. On the bottom face an equal number of holes as on vertical faces are provided and are in radial alignment therewith.

Atleast one single hole 3C, of each vertical face of the holding nut is in alignment with at least one hole 3H on the bottom surface of the holding nut. The purpose and advantage of this provision is explained subsequently.

The vent weight 6 is mounted, preferably moulded, onto a lever 7 at 7A, which has a fulcrum 7C adapted to be seated on the handle 10. In order to have a flushed construction, suitable depression can be formed on the handle to accommodate the fulcrumed end of the lever 7. The base of the vent weight 6 is provided with tapered pin 6A adapted to be engaged in the bore 3B on the vent tube. A plurality of steam escape hole 6C are provided in the region of tapered pin 6A. In place of a plurality of holes 6C it is possible to have a single hole also. The portion of the lever in the region above the vent weight is provided with a passage 7B in flow communication with the holes 6C and leading to the atmosphere.

When the lid sealingly secured to the base vessel of the pressure cooker in the usual manner, with the vent tube secured thereto and the vent weight mounted on the vent tube, in the embodiment of this invention, it has been observed, while the cooker is in steady operation, at reduced heat setting, that for a cooker of 5 litres capacity and to operate at a steady 15 lbs. p.s.i. it is sufficient to apply 350 watts electric power in place of 500 watts electric power, as is generally required.

This tremendous saving in energy to the extent of 30% is attributed to the following reasons:

1. Because of the conical section 3G at the lower end of the vent tube and deflecting effect of steam from holes 3H upon steam from side holes 3C, the steam entering the tube through the holes 3C assumes a laminar flow and the steam flows without appreciable turbulance and without loss of appreciable pressure or temperature.

(ii) The conical section renders entry of steam into middle portion 3A of vent tube gradually, preventing sudden expansion of the steam.

(iii) In view of substantially reduced loss of temperature and pressure and additional steam flowing from plurality of holes in bottom face of the holding nut, the vent tube remains in a very hot condition and thereby any condensation of steam in the region inside the vent tube or outside the vent tube around the annular hollow space formed between the outside of the vent tube and the inside of the vent weight, is eliminated.

(iv) Substantially larger quantity of dry steam is vented to the atmosphere from the passage 78 and thus there is a steady sound of the escaping steam at the required minimal application of heat, with repeated consistency.

(v) Since condensed water is not formed, it is not necessary to increase the heat input.

(vi) Since less heat is now required, just a sufficient quantity of water can be maintained in the cooker and excess use of water or over cooking is avoided, which consistently results in the maintenance of the taste, flavour and nutritional value of the cooked food.

(Vii) Due to avoidance of pressure drops inside the pressure regulation system, and greater consistency in being able to set the minimal heat to hold pressure, the range of pressure difference between full heat and reduced heat is less than 1 p.s.i. In other words, the numerical value of pressure regulation is better than 1 psi.

This is due to the increased steam entry holes 3H in the bottom face of the holding nut as well as the conical area 3G at the lower end of the vent tube 3 which together ensure a laminar flow of steam of increased quantity without appreciable pressure and heat loss.

We claim:

1. An improved pressure regulating system for use in pressure cookers comprising of a vent tube adapted to be secured in a hole in the lid of the pressure cooker by a hollow holding nut and a vent weight adapted to be freely seated in the vent tube by a tapered pin at the top of said vent tube, said vent weight being mounted on a fulcrumed lever which has a passage exposed to the atmosphere and in flow communication with one or more openings formed through the base section of the vent weight which extends laterally from said tapered pin, characterized by the improvement wherein said vent tube comprises of a plurality of sections including:

(a) a lowermost frusto conical section having an inward taper towards its top; and
   (b) an upper cylindrical section having a narrow bore for receiving the tapered pin of the vent weight, and in flow communication with the narrow end of an upper frusto conical shaped channel having an inward taper toward the top end, said latter channel being disposed with its larger end of said taper being contiguous to the upper end of;
   (c) an intermediate central cylindrical section, said intermediate cylindrical section having a central cylindrical passage of substantially larger diameter than the bore of aforesaid upper cylindrical section and communicating with:
      (i) said upper frusto conical section and
      (ii) said lowermost frusto conical section to provide a central steam passage between said bore and said lowermost frusto conical section,
   (d) and wherein said hollow holding nut includes an enlarged lower cylindrical chamber having a planar bottom surface and a lateral side, a plurality of holes through said bottom surface and also through the lateral side, each hole in the lateral side being in alignment with a hole in the bottom planar surface, for the escape of steam from the pressure cooker through the vent tube, said lower cylindrical chamber of the holding nut being in flow alignment and communication through an upper cylindrical chamber in the nut which is in flow alignment and communication with said lowermost frusto conical section of said vent tube, the arrangement being such that when the vent tube is secured to the lid of the pressure cooker with the help of the holding nut and the vent weight is mounted on said vent tube through said tapered pin, the steam formed in the pressure cooker builds up to a predetermined pressure, initially assumes a laminar flow in said enlarged lower cylindrical section of the holding nut, and continues to flow as a laminar stream through said sections of the holding nut and the vent tube, and then escapes at a steady rate through the vent weight as dry steam without any appreciable quantity of condensed water.

* * * * *